United States Patent
Machida

(10) Patent No.: US 11,119,205 B2
(45) Date of Patent: Sep. 14, 2021

(54) COMMUNICATION DEVICE, COMMUNICATION METHOD, AND COMMUNICATION PROGRAM

(71) Applicant: HAPSMOBILE INC., Tokyo (JP)

(72) Inventor: Akinori Machida, Tokyo (JP)

(73) Assignee: HAPSMOBILE INC., Tokyo (JP)

( * ) Notice: Subject to any disclaimer, the term of this patent is extended or adjusted under 35 U.S.C. 154(b) by 0 days.

(21) Appl. No.: 17/184,932

(22) Filed: Feb. 25, 2021

(65) Prior Publication Data

US 2021/0199789 A1 Jul. 1, 2021

Related U.S. Application Data

(63) Continuation of application No. PCT/JP2019/034762, filed on Sep. 4, 2019.

(30) Foreign Application Priority Data

Oct. 5, 2018 (JP) .............................. JP2018-190157

(51) Int. Cl.
*H04W 24/00* (2009.01)
*G01S 13/56* (2006.01)
(Continued)

(52) U.S. Cl.
CPC ................ *G01S 13/56* (2013.01); *G06T 7/10* (2017.01); *H04B 17/309* (2015.01);
(Continued)

(58) Field of Classification Search
CPC ..... G01S 13/56; H04B 17/309; H04B 17/391; G06T 7/10; G06T 2207/30181;
(Continued)

(56) References Cited

U.S. PATENT DOCUMENTS 8,831,586 B2   9/2014 Gao et al.
10,107,926 B1 * 10/2018 Elder .................... G01V 1/223
(Continued)

FOREIGN PATENT DOCUMENTS

CN   103313185 A  *  9/2013
CN   107222887 A  *  9/2017
(Continued)

OTHER PUBLICATIONS

International Search Report dated Nov. 5, 2019, of counterpart International Application No. PCT/JP2019/034762, along with an English translation.

(Continued)

*Primary Examiner* — Mahendra R Patel
(74) *Attorney, Agent, or Firm* — DLA Piper LLP (US)

(57) ABSTRACT

A communication device includes: a communication unit that communicates with a plurality of wireless terminals in a communication area; a number-of-terminals acquisition unit that acquires a number of wireless terminals communicating with the communication unit for a predetermined period of time on the basis of information on communication performed between the wireless terminals and the communication unit; a terminal position acquisition unit that acquires positions of the wireless terminals communicating with the communication unit for a predetermined period of time on the basis of the information on the communication performed between the wireless terminals and the communication unit; and a distribution acquisition unit that acquires a distribution of the wireless terminals on the basis of the number of wireless terminals acquired by the number-of-terminals acquisition unit and the positions of the wireless terminals acquired by the terminal position acquisition unit.

17 Claims, 3 Drawing Sheets

(51) Int. Cl.
*H04B 17/309* (2015.01)
*H04B 17/391* (2015.01)
*G06T 7/10* (2017.01)
*H04W 64/00* (2009.01)

(52) U.S. Cl.
CPC ........ *H04B 17/391* (2015.01); *H04W 64/003* (2013.01); *H04W 64/006* (2013.01); *G06T 2207/30181* (2013.01); *G06T 2207/30232* (2013.01)

(58) Field of Classification Search
CPC ...... G06T 2207/30232; H04W 64/003; H04W 64/006; H04W 16/18; H04W 24/08; H04W 84/06; H04W 24/02; H04W 16/26; H04W 84/00; H04W 24/10; H04W 24/40; H04W 4/029; H04W 4/02; H04W 4/00; H04M 3/00
USPC ...................................................... 455/456.1
See application file for complete search history.

(56) References Cited

U.S. PATENT DOCUMENTS

| | | | | |
|---|---|---|---|---|
| 10,278,179 | B2* | 4/2019 | Amini | H04W 4/023 |
| 10,356,681 | B2* | 7/2019 | Emmanuel | H04W 4/023 |
| 10,429,513 | B2* | 10/2019 | Yun | G01S 5/06 |
| 2007/0287473 | A1* | 12/2007 | Dupray | H04W 4/029 |
| | | | | 455/456.1 |
| 2008/0204699 | A1* | 8/2008 | Benz | G01C 15/002 |
| | | | | 356/4.01 |
| 2011/0021234 | A1* | 1/2011 | Tibbitts | H04W 48/04 |
| | | | | 455/517 |
| 2012/0058775 | A1* | 3/2012 | Dupray | G01S 5/0278 |
| | | | | 455/456.1 |
| 2013/0012188 | A1* | 1/2013 | Gao | H04W 24/10 |
| | | | | 455/422.1 |
| 2013/0196687 | A1* | 8/2013 | Iwamura | H04W 24/10 |
| | | | | 455/456.1 |
| 2013/0285855 | A1* | 10/2013 | Dupray | G01S 5/0278 |
| | | | | 342/451 |
| 2014/0204925 | A1* | 7/2014 | Otomo | H04W 68/04 |
| | | | | 370/338 |
| 2014/0211645 | A1* | 7/2014 | Sekine | H04W 48/12 |
| | | | | 370/252 |
| 2015/0119022 | A1* | 4/2015 | Saito | H04W 64/00 |
| | | | | 455/426.1 |
| 2015/0215797 | A1* | 7/2015 | Yoshimi | H04W 24/08 |
| | | | | 370/252 |
| 2015/0321768 | A1* | 11/2015 | Kumar | B64D 45/00 |
| | | | | 340/870.07 |
| 2016/0131794 | A1* | 5/2016 | Dransfield | G01V 7/14 |
| | | | | 702/2 |
| 2018/0287696 | A1* | 10/2018 | Barbieri | H04W 36/22 |
| 2018/0324323 | A1* | 11/2018 | Kawara | H04N 1/40062 |
| 2019/0044611 | A1* | 2/2019 | Treesh | H04B 7/2041 |
| 2019/0320374 | A1* | 10/2019 | Kato | H04W 72/10 |
| 2020/0269809 | A1* | 8/2020 | Sanji | B60R 25/31 |

FOREIGN PATENT DOCUMENTS

| | | | | |
|---|---|---|---|---|
| GB | 750436 | A * | 6/1956 | ............... G01S 1/02 |
| JP | 2004-336408 | A | 11/2004 | |
| JP | 2012-054921 | A | 3/2012 | |
| JP | 2013-522987 | A | 6/2013 | |
| JP | 2017-184204 | A | 10/2017 | |
| JP | 2017-208611 | A | 11/2017 | |
| WO | 2012/018005 | A1 | 2/2012 | |
| WO | WO-2012018005 | A1 * | 2/2012 | ............. H04W 4/02 |
| WO | WO-2020071043 | A1 * | 4/2020 | ........... H04W 84/06 |

OTHER PUBLICATIONS

Decision to Grant a Patent for counterpart JP 2018-190157 dated Apr. 7, 2020, with English translation.

* cited by examiner

COMMUNICATION DEVICE, COMMUNICATION METHOD, AND COMMUNICATION PROGRAM

TECHNICAL FIELD

This disclosure relates to a communication device, a communication method, and a communication program.

BACKGROUND

Minimization of drive test (MDT) has been present as a technology for wireless communication conventionally. The technology described in Japanese National Phase Patent Publication No. 2013-522987 allows a user terminal to report information on neighboring cells acquired using the MDT technology to the network side to perform maintenance.

When expanding a communication area, it is important for mobile communication carriers to recognize the areas where a large number of user terminals are present since they need to invest in installing base stations and other facilities. However, if base stations have not been installed, it has not been possible to collect information from the user terminals using the MDT technology conventionally, and it has been difficult to recognize the areas with a large number of user terminals present.

It could therefore be helpful to provide a communication device, a communication method, and a communication program that are capable of surveying a distribution of user terminals even in areas free of base stations.

SUMMARY

I thus provide:

A communication device including a communication unit that communicates with a plurality of wireless terminals in a communication area; a number-of-terminals acquisition unit that acquires a number of wireless terminals communicating with the communication unit for a predetermined period of time on the basis of information on communication performed between the wireless terminals and the communication unit; a terminal position acquisition unit that acquires positions of the wireless terminals communicating with the communication unit for a predetermined period of time on the basis of the information on the communication performed between the wireless terminals and the communication unit; and a distribution acquisition unit that acquires a distribution of the wireless terminals on the basis of the number of wireless terminals acquired by the number-of-terminals acquisition unit and the positions of the wireless terminals acquired by the terminal position acquisition unit.

When communicating with the wireless terminals, it is preferable that the communication unit may acquire communication quality information and position information of the wireless terminals as the information on the communication.

The communication device may preferably further include a determination unit that determines that a communication base station is installed on a ground on the basis of the distribution of the wireless terminals acquired by the distribution acquisition unit if a number of the wireless terminals in a predetermined area exceeds a predetermined number, and determines that an aircraft including a base station function is caused to stay in an air over the predetermined area if the number of wireless terminals in the predetermined area does not exceed the predetermined number.

It is preferable that the distribution acquisition unit and the determination unit may be distributed in a computer or server distributed on the ground.

It is preferable that the communication unit may be distributed in an aircraft that flies over a survey area that is greater than the communication area for a predetermined period of time.

The communication device may preferably further include a decision unit that determines a flight route of the aircraft on the basis of the distribution of the wireless terminals acquired by the distribution acquisition unit.

It is preferable that the decision unit may determine the survey area on the basis of information on the communication acquired by the communication unit and information on the communication acquired by the base station distributed on the ground.

The communication device may preferably further include a camera unit that generates geographic information including an image of the ground. In this instance, it is preferable that the determination unit may determine the survey area on the basis of superimposing the geographic information generated by the camera unit and the positions of the wireless terminals acquired by the terminal position acquisition unit.

A communication method causes a computer to execute the steps of: communicating, by a communication unit, with a plurality of wireless terminals in a communication area; acquiring a number of wireless terminals communicating with the communication unit on the basis of information on communication performed between the wireless terminals and the communication unit; acquiring positions of the wireless terminals communicating with the communication unit on the basis of the information on the communication performed between the wireless terminals and the communication unit; and acquiring a distribution of the wireless terminals present in the communication area on the basis of the number of wireless terminals acquired in the number-of-terminals acquiring step and the positions of the wireless terminals acquired in the terminal position acquiring step.

A communication program causes a computer to implement the functions of: performing communication between a communication unit and a plurality of wireless terminals in a communication area; acquiring a number of wireless terminals communicating with the communication unit on the basis of information on the communication performed between the wireless terminals and the communication unit; acquiring positions of the wireless terminals communicating with the communication unit on the basis of the information on the communication performed between the wireless terminals and the communication unit; and acquiring a distribution of the wireless terminals present in the communication area on the basis of the number of wireless terminals acquired by the number-of-terminals acquisition function and the positions of the wireless terminals acquired by the terminal position acquisition function.

I thus provide a communication device, a communication method, and a communication program that are capable of surveying the distribution of user terminals even in areas where base stations have not been installed.

REFERENCE NUMBERS

Figure 1:
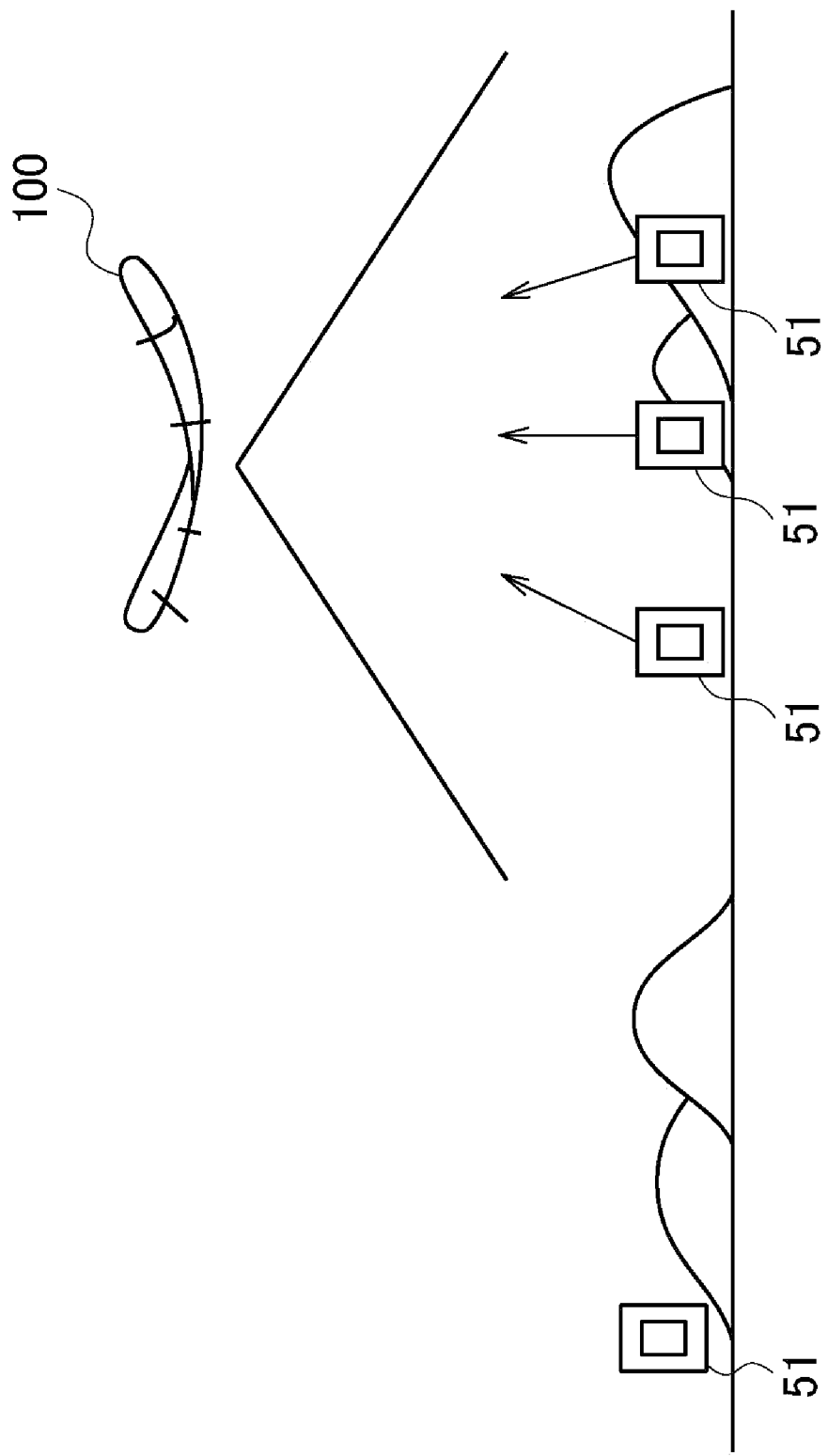
FIG. 1 is a diagram illustrating a communication device according to an example.

1: communication device
11: communication unit
12: number-of-terminals acquisition unit
13: terminal position acquisition unit
14: distribution acquisition unit
15: determination unit
16: decision unit
51: wireless terminal
100: aircraft

DETAILED DESCRIPTION

Examples of my devices, methods and programs will be described below.

FIG. 1 is a diagram illustrating a communication device.

Figure 2:
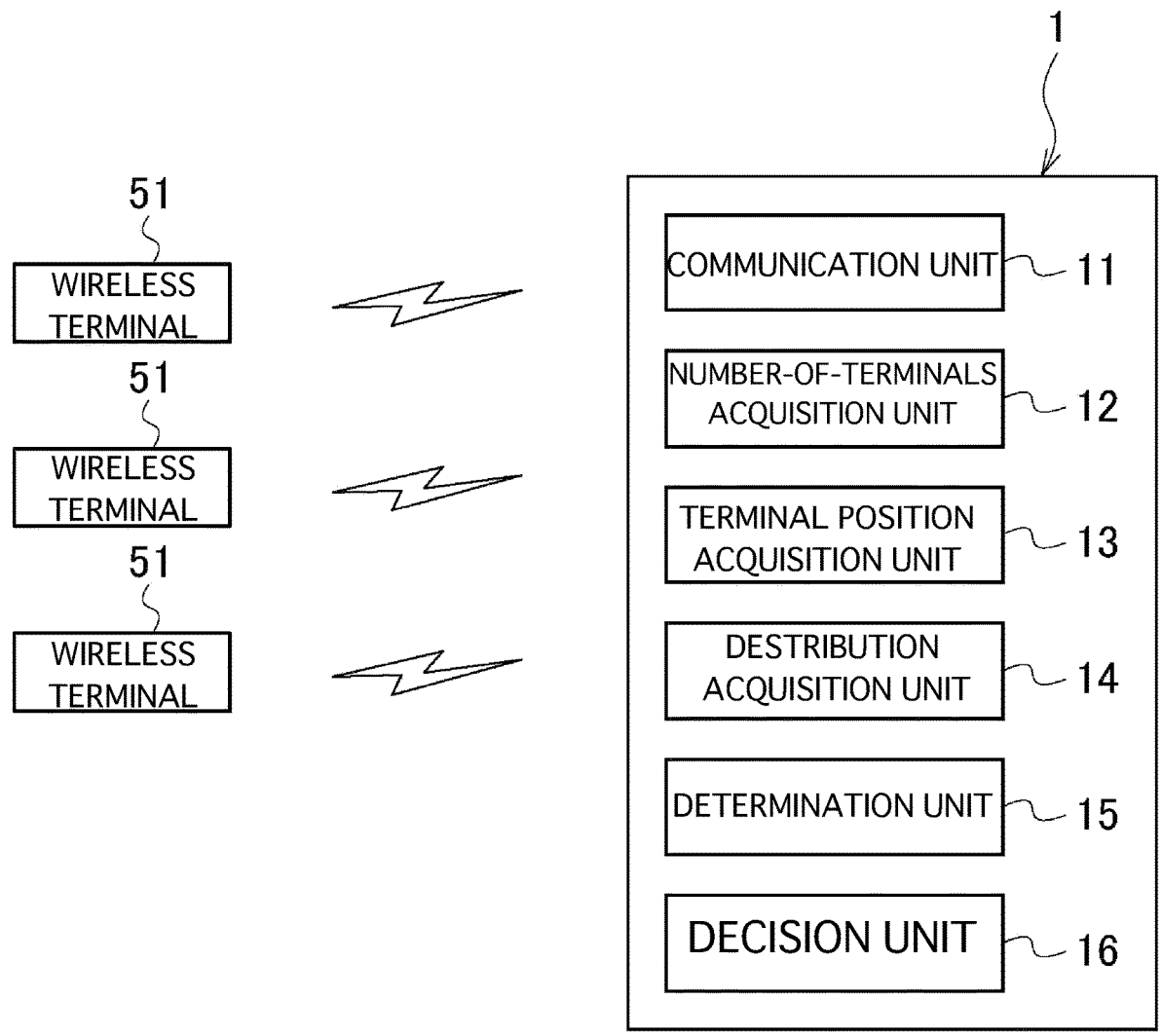
FIG. 2 is a block diagram illustrating a communication device according to an example.

FIG. 2 is a block diagram illustrating a communication device.

As shown in FIG. 2, a communication device 1 includes a communication unit 11, a number-of-terminals acquisition unit 12, a terminal position acquisition unit 13, a distribution acquisition unit 14, a determination unit 15, and a decision unit 16.

At least the communication unit 11 of the communication device 1 is distributed to an aircraft 100, as shown in FIG. 1, that flies over the survey area for a predetermined period of time. The "predetermined period of time" may be directed to, for example, a few weeks, a few months, or a year. The aircraft 100, for example, flies at a high altitude of about 20 km and configures a high altitude platform system (HAPS) on which at least a first communication unit 11 is mounted. The aircraft 100 may be, as an example, a solar plane or a solar airship that allows for longer flights than a normal airplane or airship. When the aircraft 100 flies in the stratosphere, for example, the airflow in the stratosphere is stable, allowing the aircraft 100 to stay in the air for a long period of time. The altitude at which the aircraft 100 flies is not limited to about 20 km, and thus may be higher or lower than 20 km. If the wireless terminal 51 is a conventional terrestrial cellular mobile terminal in which the MDT function described below is performed, the distance on the technical specification (3GPP described below) that allows communication with the base station, for example, is about 100 km for LTE. In this configuration, the altitude of the aircraft may be about 100 km or less. If future technological innovations allow even the terrestrial cellular wireless terminal 51 to perform communication over a distance of about 100 km or more, the altitude of the aircraft 100 may be increased in accordance with the communication distance of the wireless terminal 51. This may be a satellite orbiting outside the atmosphere of the earth. However, satellites (other than geostationary satellites) are different from the aircraft 100 in that they move around the earth and are not capable of staying in a predetermined area all the time as the aircraft 100 does. The communication area of the first communication unit 11 may be a radius of about 100 km from the first communication unit 11, for example. The survey area may be preferably set greater than the communication area of the communication unit 11. The aircraft 100 flies over the survey area and loops a predetermined route, for example, to investigate the number of wireless terminals 51 and the positions of the wireless terminals 51 in the survey area. Although loop flight is not possible, satellites (other than geostationary satellites) may be used as a method to measure the area. In addition to the above examples (solar plane or solar-powered airship), any aircraft 100 may be employed that has the capability of flying in the air such as airplanes, airships, balloons, helicopters, and drones. The aircraft 100 may include any one or more of the following components that comprise the communication device 1: the number-of-terminals acquisition unit 12, terminal position acquisition unit 13, distribution acquisition unit 14, determination unit 15, and decision unit 16. As for the components, the number-of-terminals acquisition unit 12, terminal position acquisition unit 13, distribution acquisition unit 14, determination unit 15, and decision unit 16 may be distributed on the ground in place of the positions in the aircraft 100. The communication unit 11 is always installed in the aircraft 100. The aircraft 100 may also include various sensors or cameras. Examples of the sensors may include, but are not limited to, sensors capable of performing remote sensing by laser ranging and Doppler radar. Examples of the cameras may include, but are not limited to, visible light cameras, infrared cameras, and terrain cameras (stereoscopic cameras). On the basis of the measurement results of these sensors and cameras and the results of the survey of the distribution and other trends of the wireless terminals 51 described below, the communication device 1 is allowed to create a more advanced plan for the installation of the base stations.

An example of the use of this system is as follows.

(1) When installing a new base station in an area where no base station has been installed, an aircraft 100 on which a communication unit 11 is mounted is caused to stay in the sky for a long period of time to acquire information on communication, including the position and altitude information of the wireless terminals 51, from the wireless terminals 51 in three dimensions. Acquiring the information in three dimensions is as follows. Although terrestrial cellular communication cells are not constructed more than 50 meters above the ground in general, drones, helicopters, and airplanes including the communication functions of wireless terminals 51 flying at altitudes exceeding 50 m above the ground level are also detected, and the detected information is used as a reference in the design of base stations to consider the construction of three-dimensional cells (cells with communication coverage not only in the plane but also in the vertical direction, which allows communication from the ground to an altitude of about 1,000 meters, as an example) using the ground cellular system with HPAS as well as ground base stations. This enables wireless communication using the terrestrial cellular system without the use of aviation radios, even at about 50 meters or more above a ground level, which has not been covered by the ground base stations in the past, by allowing the aircraft 100 on which the communication unit 11 is mounted to always stay in the air as a mobile base station for providing mobile communication services. This allows not only data communication including IoT with drones, helicopters, and airplanes but also for manned flights and communication with the crew in the same manner as in the communication on the ground. For drones, this may also be used for air traffic control and flight control of multiple drones.

(2) In the event that a major disaster occurs over a wide area such as a large-scale earthquake, tsunami, large-scale landslide, or large-scale volcanic eruption, and multiple base stations are rendered inoperable, and there is no prospect of early recovery, temporary base stations may need to be installed as soon as possible. In this instance, it is preferable to install temporary base stations with priority given to areas where the communication environment needs to be restored quickly, such as areas with many disaster victims. Temporary base stations include vehicles that are capable of carrying portable base stations that use satellite links as access lines to the backbone network, and moored balloon systems including wireless communication devices. In addition, various methods may be considered such as drones and entrance radio devices that relay radio signals from operational mobile base stations to expand cell coverage. In this instance, the aircraft 100 on which the communication unit 11 is mounted may stay in the air for a long period of time over the disaster area to acquire information on communication from the wireless terminals 51 and also perform communication between actual users. In addition, the aircraft 100 may mount a camera as described above, for example, allowing the aircraft 100 to use the images taken by the camera, including real-time images to determine whether a temporary base station may be installed or what area recovery solution should be selected. For example, if a situation such as a road being cut off is immediately grasped from the results of images taken by cameras, for example, the vehicles are prevented from passing the cut off road, allowing immediate determination of whether to search for another area where a base station may be installed, or whether to use a drone or entrance radio as a recovery solution, or whether to use the aircraft 100 on which the communication unit 11 is mounted as the main recovery method. In addition, the position information of the wireless terminals 51 and other information (the wireless terminals 51 are in a communication-enabled state. The position information and other information include the time when the position information is acquired) are mapped on the geographic information including images imaged by the camera in the data processing device (not shown), allowing the disaster situation to be grasped in a format that includes real time from the distribution of the communication availability of the wireless terminals 51 and their changes over time, and providing effective information for disaster countermeasures.

(3) In the event of a mountain accident or maritime accident, the aircraft 100 on which the communication unit 11 is mounted is caused to stay in the sky for a long period of time or loop, and acquires communication information, position information, and other information (including time information) from each wireless terminal 51 in a communication-enabled state owned by a person in distress. The person in distress that encounters a slide or avalanche is likely to be unable to move (the same may be applied to maritime accidents). Even in this instance, as long as the wireless terminal 51 is turned on and ready for communication, the communication unit 11 is allowed to receive communication information, position information, and other information (including time information) from the wireless terminal 51 owned by the person in distress by keeping the aircraft 100 on which the communication unit 11 is mounted in the sky, even if the wireless terminal 51 is outside the area coverage of the existing mobile base station on the ground, allowing the person in distress to be found. This also allows the position information of the wireless terminal 51 and other information to be mapped on the geographical information including images taken by the camera mounted on the aircraft 100, existing aerial photographs, and digital maps, facilitating the grasping of the situation around the area in distress. In the communication device 1, the communication unit 11 has a wide communication range (as an example, a radius of about 100 km), narrowing down the search range by performing the mapping, for example, described above before searching for a person in distress by a search helicopter, for example, thus enabling rescue of the person in distress at an earlier stage.

The communication unit 11 communicates with wireless terminals 51 using mobile communication technology. The wireless terminals 51 may include, for example, cell phones, smartphones, tablet terminals, mobile communication modules, and IoT devices. The communication unit 11 communicates with a plurality of wireless terminals 51 on the ground within a communication area. When communicating with the wireless terminals 51, the communication unit 11 acquires communication quality information and position information of the wireless terminals as information on the communication. The communication unit 11 acquires, for example, communication quality information between the communication unit 11 and the wireless terminals 51 from the wireless terminals 51 based on the minimization technology of drive test (MDT) of the third generation partnership project 3GPP, and also acquires the position information of the terminals measured by the wireless terminals 51 from the wireless terminals 51.

The wireless terminals 51 are also capable of transmitting their own position information to the communication unit 11 in real time. This allows the communication unit 11 to acquire the position information of the terminals measured by the wireless terminals 51 from the wireless terminals 51 in real time. Since the communication unit 11 is distributed in the aircraft 100, the communication range of the wireless terminals 51 fails to be out of range, and the position information of the wireless terminals 51 may be acquired in real time.

The communication unit 11 is capable of flying over the survey area by being mounted on the aircraft 100, allowing the communication unit 11 to acquire the information on communication from the wireless terminals 51 in terms of the survey area in phase and in terms of time regarding the stay over the survey area. That is, the communication unit 11 is allowed to acquire information on the communication in the survey area over a long period of time from the wireless terminals 51.

For example, the communication unit 11 may be configured with some or all of the functions of the base station distributed on the ground.

Conventionally, the position information of the wireless terminals, the total traffic amount of each and all of the wireless terminals, the number of the wireless terminals (number of users), and the types of the wireless terminals (mobile terminal or Internet of Things (IoT)) vary greatly depending on the time period and season, and thus have failed to be acquired. In contrast, the communication unit 11 is capable of acquiring the information on the communication over a long period of time, allowing plans such as economical and efficient plans for the construction of base stations and the employment of communication areas by HAPS to be formulated. In particular, in the construction plan of the base stations, various details such as which locations to build the base stations, how much coverage to be provided by the base stations, the order of the base stations to be built when multiple base stations are constructed, and the frequency bandwidth of communication (the amount of traffic that can be processed) may be determined.

The number-of-terminals acquisition unit 12 acquires the number of wireless terminals 51 communicating with the communication unit 11 on the basis of the information on the communication performed between the wireless terminals 51 and the communication unit 11. The number-of-terminals acquisition unit 12 investigates the number of wireless terminals 51 in the communication area on the basis of, for example, the communication quality information acquired from each of the wireless terminals 51, and acquires the number of wireless terminals 51. The number-of-terminals acquisition unit 12 acquires the number of wireless terminals 51, for example, on the basis of the number of pieces of communication quality information transmitted from the wireless terminals 51.

The terminal position acquisition unit 13 acquires the positions of the wireless terminals 51 communicating with the communication unit 11 on the basis of the information on the communication performed between the wireless terminals 51 and the communication unit 11. The terminal position acquisition unit 13 acquires the position of each of the plurality of wireless terminals 51 on the basis of, for example, the position information of the wireless terminals 51 acquired from the wireless terminals 51.

The distribution acquisition unit 14 acquires a distribution of the wireless terminals 51 on the basis of the number of wireless terminals 51 acquired by the number-of-terminals acquisition unit 12 and the positions of the wireless terminals 51 acquired by the terminal position acquisition unit 13. As for the information on the communication, the communication quality information and position information are associated with each of the wireless terminals 51. Accordingly, the distribution acquisition unit 14 acquires the information on the communication from multiple wireless terminals 51 to acquire the distribution of the wireless terminals 51.

For example, the aircraft 100 flies a predetermined loop route, allowing it to stay in the air over a specific area. This allows the distribution acquisition unit 14 to more reliably acquire the distribution of the wireless terminals 51 and also acquire the changes of the distribution of the wireless terminals 51 in time. In addition, the aircraft 100 also flies in the air over a wider area by moving its loop route and flying the moved loop route. This allows the distribution acquisition unit 14 to acquire the distribution of the wireless terminals 51 over a wider area.

The determination unit 15 determines that a communication base station is installed on the ground on the basis of the distribution of the wireless terminals 51 acquired by the distribution acquisition unit 14 if the number of the wireless terminals 51 in a predetermined area exceeds a predetermined number. The determination unit 15 determines that the aircraft 100 including a base station function to stay in the air over the predetermined area if the number of wireless terminals 51 in the predetermined area does not exceed the predetermined number. That is, the determination unit 15 determines that it is preferable to install communication base stations on the ground in the areas where a large number of wireless terminals 51 are present. In contrast, in the areas where the number of wireless terminals 51 is low, the determination unit 15 determines that it is preferable that HAPS may be used and the aircraft 100 including the base station function may be allowed to fly permanently.

The distribution acquisition unit 14 is capable of acquiring the distribution of the wireless terminals 51 over a certain period of time. This allows the determination unit 15 to make a more appropriate determination as well.

The determination unit 15 sets a stepwise threshold to the number of wireless terminals 51, allowing the determination unit 15 to determine the priority of the area where the communication base station is to be installed. That is, on the basis of a comparison between the number of wireless terminals 51 and a plurality of threshold values, the determination unit 15 determines that the priority of installing the communication base stations is higher in areas where the number of wireless terminals 51 is determined to be greater. In contrast, on the basis of the comparison between the number of wireless terminals 51 and a plurality of threshold values, the determination unit 15 determines that the priority of installing the communication base stations is lower in areas where the number of wireless terminals 51 is determined to be smaller.

In addition, the determination unit 15 may determine the areas in which the communication base stations are to be provided on the basis of superimposing the geographic information containing an image of the ground generated by the camera (not shown) described above and the positions of the wireless terminals acquired by the terminal position acquisition unit. This allows for a specific consideration of where to provide the communication base stations.

It is preferable that the determination unit 15 may be mounted on a computer or server distributed on the ground. The determination unit 15 is distributed on the ground to acquire various information and take various conditions into account, allowing the determination unit 15 to make appropriate determinations while taking those conditions into account.

The decision unit 16 determines the flight route of the aircraft 100 on which the communication unit 11 is distributed on the basis of the distribution of the wireless terminals 51 acquired by the distribution acquisition unit 14. The decision unit 16 is capable of, for example, determining the flight route of the aircraft 100 as appropriate, for example, and if it determines that an area includes a large number of wireless terminals 51 on the basis of the distribution of the wireless terminals 51 acquired in real time by the distribution acquisition unit 14, the airplane 100 is caused to fly over the area with the large number of the wireless terminals 51 for a long time. The aircraft 100 flies on the basis of the flight route determined by the decision unit 16.

The decision unit 16 may determine the survey area on the basis of the information on the communication acquired by the communication base station (ground station) distributed on the ground and the information on the communication acquired by the communication unit 11 distributed on the aircraft 100. The decision unit 16 compares, for example, the information on the communication acquired at the ground station to the information on the communication acquired by the communication unit 11, and if information on the communication transmitted from the same wireless terminal 51 is present, it determines that the area where the wireless terminal 51 is located is outside the survey area. This is because for the areas where the ground stations already exist, the determination unit 15 need not make a determination on the basis of the acquired distribution of the wireless terminals 51. This allows the decision unit 16 to determine the flight route so that the airplane does not fly over the area where the ground station is present.

Next, my communication methods will be described.

Figure 3:
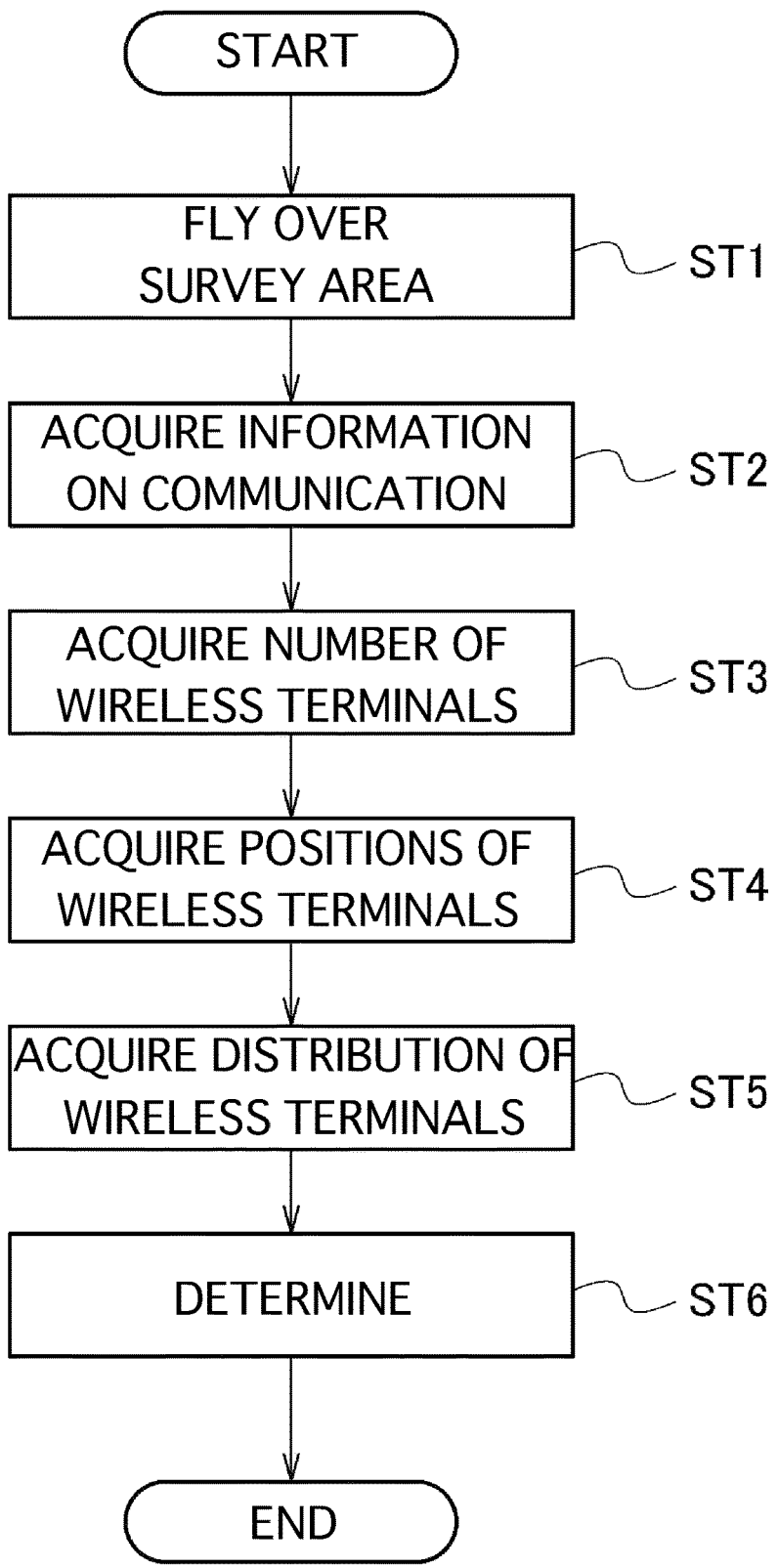
FIG. 3 is a flowchart illustrating a communication method according to an example.

FIG. 3 is a flowchart illustrating a communication method.

In step ST1, the aircraft 100 on which at least the communication unit 11 is mounted flies over the survey area. The aircraft 100, for example, flies a predetermined loop route for a certain period of time, then moves the flight route, and repeats the flight on a new loop route. This allows the communication device 1 to survey the distribution of the wireless terminals 51 over a wider area.

In step ST2, the communication unit 11 mounted on the aircraft 100 acquires information on the communication from the wireless terminals 51. The communication unit 11 acquires information on the communication quality between the wireless terminals 51 and the communication unit 11 (communication quality information) and the position information acquired by, for example, the global positioning system (GPS) of the wireless terminals 51 from the wireless terminals 51 as information on communication on the basis of the MDT of 3GPP.

In step ST3, the number-of-terminals acquisition unit 12 acquires the number of wireless terminals 51 in the communication area of the communication unit 11, for example, on the basis of the communication quality information acquired in step ST2. Further, the number-of-terminals acquisition unit 12 acquires the number of wireless terminals 51 in an area wider than the communication area of the communication unit 11 (survey area) since the aircraft 100 flies over a wide area.

In step ST4, the terminal position acquisition unit 13 acquires the positions of the wireless terminals 51 in the communication area, for example, on the basis of the position information of the wireless terminals 51 acquired in step ST2. In the same manner as in step ST3, the terminal position acquisition unit 13 acquires the positions of the wireless terminals 51 in an area (survey area) wider than the communication area of one communication unit 11 since the aircraft 100 flies over a wide area.

In step ST5, the distribution acquisition unit 14 acquires the distribution of the wireless terminals 51 on the basis of the number of wireless terminals 51 acquired in step ST3 and the positions of the wireless terminals 51 acquired in step ST4. The distribution acquisition unit 14 is capable of acquiring the distribution of the wireless terminals 51 in a survey area wider than the communication area of the communication unit 11.

In step ST6, on the basis of the distribution of the wireless terminals 51 acquired in step ST5, the determination unit 15 determines, for example, that a communication base station may be installed on the ground in an area with a large number of wireless terminals 51, and that an aircraft 100 including a base station function may stay in the air over an area with a less number of wireless terminals 51.

After step ST6, the process is completed.

Next, advantageous effects will be described.

The communication device 1 includes a number-of-terminals acquisition unit 12 that acquires the number of wireless terminals 51 on the basis of information on the communication performed between the wireless terminals 51 and the communication unit 11, a terminal position acquisition unit 13 that acquires the positions of the wireless terminals 51 on the basis of the information on the communication performed between the wireless terminals 51 and the communication unit 11, and a distribution acquisition unit 14 that acquires the distribution of the wireless terminals 51 present in the communication area on the basis of the number of wireless terminals 51 acquired by the number-of-terminals acquisition unit 12 and the positions of the wireless terminals 51 acquired by the terminal position acquisition unit 13.

The communication unit 11 of the communication device 1 acquires information on communication from the wireless terminals 51 on the basis of the MDT of 3GPP. This allows the communication device 1 to survey the distribution of the wireless terminals 51 even in areas free of communication base stations on the ground. The survey of the distribution of the wireless terminals 51 allows the communication device 1 to accurately estimate the investment effectiveness of whether to install communication base stations on the ground or distribute base station functions in the sky using HAPS.

When communicating with the wireless terminals 51, the communication unit 11 of the communication device 1 acquires communication quality information and position information of the wireless terminals 51 as information on the communication.

The communication unit 11 acquires communication quality information and position information from the wireless terminals 51 on the basis of the MDT carried in the 3GPP standard. Accordingly, the communication device 1 need not establish new standards or install applications to acquire information on communication in the wireless terminals 51 and the communication unit 11. This allows the communication device 1 to use existing communication standards to survey the distribution of the wireless terminals 51.

The communication device 1 further includes a determination unit 15 that, on the basis of the distribution of the wireless terminals 51 acquired by the distribution acquisition unit 14, determines that a communication base station may be installed on the ground if the number of wireless terminals 51 in the predetermined area exceeds a predetermined number, and determines that the aircraft 100 including the base station function may stay in the sky above the predetermined area if the number of wireless terminals 51 in the predetermined area does not exceed the predetermined number.

The communication device 1 thus allows the communication carriers to predict the investment effect on the basis of the determination whether to install the communication base stations on the ground or to distribute the base station functions in the sky using HAPS.

The communication unit 11 of the communication device 1 is distributed on the aircraft 100 that flies over the survey area for a predetermined period of time.

That is, the communication device 1 uses the HAPS technology with the communication unit 11 mounted on the aircraft 100. This allows the communication device 1 to survey the distribution of the wireless terminals 51 even in areas free of communication base stations on the ground. The aircraft 100 cycles the same flight route to allow the communication device 1 to accurately acquire the distribution of the wireless terminals 51 in the survey area. The flight route of the aircraft 100 is moved to allow distribution of the wireless terminals 51 to be acquired over a wider area.

Further, the "predetermined period of time" is directed to, for example, a few weeks, a few months, or a year. This allows the communication device 1 to stay in the air for a long period of time by a single aircraft, and thus to acquire changes over time in the distribution of the wireless terminals 51 over a long period of time in the measurement area. That is, the communication device 1 can keep track of day/night and seasonal variations in the distribution of the wireless terminals 51.

The decision unit 16 of the communication device 1 determines the flight route of the aircraft 100 on the basis of the distribution of the wireless terminals 51 acquired by the distribution acquisition unit 14.

The communication device 1 flies the aircraft 100 on the basis of the distribution of the wireless terminals 51 acquired in real time by the distribution acquisition unit 14, achieving a more accurate distribution of the wireless terminals 51 again.

The decision unit 16 of the communication device 1 determines the survey area on the basis of the information on the communication acquired by the communication unit 11 and the information on the communication acquired by the communication base station distributed on the ground.

The communication device 1 need not include areas where communication base stations have already been installed in the survey area. This prevents the communication device 1 from conducting unnecessary surveys.

A communication method causes a computer to execute the steps of: acquiring the number of wireless terminals 51 on the basis of information on communication performed between the wireless terminals 51 and the communication unit 11, acquiring positions of the wireless terminals 51 on the basis of the information on the communication performed between the wireless terminals 51 and the communication unit 11, and acquiring a distribution of the wireless terminals 51 present in the communication area on the basis of the number of wireless terminals 51 acquired in the number-of-terminals acquiring step and the positions of the wireless terminals 51 acquired in the terminal position acquiring step.

This allows the communication method to survey the distribution of the wireless terminals 51 even in areas where communication base stations are not installed. The survey of the distribution of the wireless terminals 51 allows the communication method to accurately estimate the investment effect of whether to install communication base stations on the ground or to distribute base station functions in the sky using HAPS.

A communication program causes a computer to execute the functions of: acquiring the number of wireless terminals 51 on the basis of the information on the communication performed between the wireless terminals 51 and the communication unit 11, acquiring the positions of the wireless terminals 51 on the basis of the information on the communication performed between the wireless terminals 51 and the communication unit 11, and acquiring the distribution of the wireless terminals 51 present in the communication area on the basis of the number of the wireless terminals 51 acquired by the number-of-terminals acquisition function and the positions of the wireless terminals 51 acquired by the terminal position acquisition function.

This allows the communication program to survey the distribution of the wireless terminals 51 even in areas where no communication base stations are installed. In addition, the survey of the distribution of the wireless terminals 51 allows the communication program to accurately estimate the effect of investment, whether to install communication base stations on the ground or base station functions in the sky using HAPS.

What is claimed is:

1. A communication device comprising:
   a communication unit that communicates with a plurality of wireless terminals in a communication area;
   a number-of-terminals acquisition unit that acquires a number of wireless terminals communicating with the communication unit for a predetermined period of time based on information on the communication performed between the wireless terminals and the communication unit;
   a terminal position acquisition unit that acquires positions of the wireless terminals communicating with the communication unit for a predetermined period of time based on the information on the communication performed between the wireless terminals and the communication unit;
   a distribution acquisition unit that acquires a distribution of the wireless terminals based on the number of wireless terminals acquired by the number-of-terminals acquisition unit and the positions of the wireless terminals acquired by the terminal position acquisition unit; and
   a determination unit, wherein based on the distribution of the wireless terminals acquired by the distribution acquisition unit, if a number of wireless terminals in the predetermined area exceeds a predetermined number, the determination unit determines that a communication base station is to be installed on a ground, and if the number of wireless terminals in the predetermined area does not exceed the predetermined number, the determination unit determines that an aircraft including a base station function is caused to stay in an air over the predetermined area.

2. The communication device according to claim 1, wherein the communication unit is distributed in an aircraft that flies over a survey area greater than the communication area for a predetermined period of time.

3. The communication device according to claim 1, wherein the distribution acquisition unit and the determination unit are distributed in a computer or server distributed on the ground.

4. The communication device according to claim 1, further comprising a camera unit that generates geographic information including an image of the ground, wherein the determination unit makes a determination based on superimposing the geographic information generated by the camera unit and positions of the wireless terminals acquired by the terminal position acquisition unit.

5. A communication device comprising:
   a communication unit that communicates with a plurality of wireless terminals in a communication area;
   a number-of-terminals acquisition unit that acquires a number of wireless terminals communicating with the communication unit for a predetermined period of time based on information on the communication performed between the wireless terminals and the communication unit;
   a terminal position acquisition unit that acquires positions of the wireless terminals communicating with the communication unit for a predetermined period of time based on the information on communication performed between the wireless terminals and the communication unit; and
   a distribution acquisition unit that acquires a distribution of the wireless terminals based on the number of wireless terminals acquired by the number-of-terminals acquisition unit and the positions of the wireless terminals acquired by the terminal position acquisition unit, wherein
   the communication unit is distributed in an aircraft that flies over a survey area that is greater than the communication area for a predetermined period of time.

6. The communication device according to claim 5, further comprising a determination unit that determines that a communication base station is to be settled on a ground based on the distribution of the wireless terminals acquired by the distribution acquisition unit if a number of the wireless terminals in a predetermined area exceeds a predetermined number, and determines that an aircraft including a base station function is caused to stay in an air over the predetermined area if the number of wireless terminals in the predetermined area does not exceed the predetermined number.

7. The communication device according to claim 6, wherein the distribution acquisition unit and the determination unit are distributed in a computer or server distributed on the ground.

8. The communication device according to claim 6, further comprising a camera unit that generates geographic information including an image of the ground, wherein the determination unit makes a determination based on superimposing the geographic information generated by the camera unit and the positions of the wireless terminals acquired by the terminal position acquisition unit.

9. The communication device according to claim 1, wherein when communicating with the wireless terminals, the communication unit acquires communication quality information and position information of the wireless terminals as information on the communication.

10. The communication device according to claim 1, further comprising a decision unit that determines a flight route of the aircraft based on the distribution of the wireless terminals acquired by the distribution acquisition unit.

11. The communication device according to claim 10, wherein the decision unit determines the survey area based on information on the communication acquired by the communication unit and information on the communication acquired by the base station distributed on the ground.

12. A communication method that causes a computer to execute the steps of:
    communicating, by a communication unit, with a plurality of wireless terminals in a communication area;
    acquiring a number of wireless terminals communicating with the communication unit based on information on the communication performed between the wireless terminals and the communication unit;
    acquiring positions of the wireless terminals communicating with the communication unit based on the information on the communication performed between the wireless terminals and the communication unit;
    acquiring a distribution of the wireless terminals present in the communication area based on the number of wireless terminals acquired in the number-of-terminals acquiring step and the positions of the wireless terminals acquired in the terminal position acquiring step; and
    based on the distribution of the wireless terminals acquired in the distribution acquiring step, if the number of wireless terminals in the predetermined area exceeds a predetermined number, determining that a communication base station is to be installed on a ground, and if the number of wireless terminals in the predetermined area does not exceed the predetermined number, determining that an aircraft including a base station function is caused to stay in an air over the predetermined area.

13. A communication method that causes a computer to execute the steps of:
    communicating, by a communication unit, with a plurality of wireless terminals in a communication area;
    acquiring a number of wireless terminals communicating with the communication unit based on information on the communication performed between the wireless terminals and the communication unit;
    acquiring positions of the wireless terminals communicating with the communication unit based on the information on the communication performed between the wireless terminals and the communication unit; and
    acquiring a distribution of the wireless terminals present in the communication area based on the number of wireless terminals acquired in the number-of-terminals acquiring step and the positions of the wireless terminals acquired in the terminal position acquiring step, wherein
    the communication unit is distributed in an aircraft that flies over a survey area that is greater than the communication area for a predetermined period of time.

14. A non-transitory computer readable recording medium storing a communication program that causes a computer to perform the functions of:
    performing communication between a communication unit and a plurality of wireless terminals in a communication area;
    acquiring a number of wireless terminals communicating with the communication unit based on information on the communication performed between the wireless terminals and the communication unit;
    acquiring positions of the wireless terminals communicating with the communication unit based on the information on the communication performed between the wireless terminals and the communication unit;
    acquiring a distribution of the wireless terminals present in the communication area based on the number of wireless terminals acquired by the number-of-terminals acquisition function and the positions of the wireless terminals acquired by the terminal position acquisition function; and
    based on the distribution of the wireless terminals acquired by the distribution acquisition function, if the number of wireless terminals in the predetermined area exceeds a predetermined number, determining that a communication base station is to be installed on a ground, and if the number of wireless terminals in the predetermined area does not exceed the predetermined number, determining that an aircraft including a base station function is caused to stay in an air over the predetermined area.

15. A non-transitory computer readable recording medium storing a communication program that causes a computer to perform the functions of:
    performing communication between a communication unit and a plurality of wireless terminals in a communication area;
    acquiring a number of wireless terminals communicating with the communication unit based on information on the communication performed between the wireless terminals and the communication unit;
    acquiring positions of the wireless terminals communicating with the communication unit based on the information on the communication performed between the wireless terminals and the communication unit; and
    acquiring a distribution of the wireless terminals present in the communication area based on the number of wireless terminals acquired by the number-of-terminals acquisition function and the positions of the wireless terminals acquired by the terminal position acquisition function, wherein
    the communication unit is distributed in an aircraft that flies over a survey area that is greater than the communication area for a predetermined period of time.

16. The communication device according to claim 5, wherein when communicating with the wireless terminals, the communication unit acquires communication quality information and position information of the wireless terminals as information on the communication.

17. The communication device according to claim 5, further comprising a decision unit that determines a flight route of the aircraft based on the distribution of the wireless terminals acquired by the distribution acquisition unit.

\* \* \* \* \*